United States Patent [19]

Berger et al.

[11] 4,005,879
[45] Feb. 1, 1977

[54] CONDUIT JOINT

[75] Inventors: Sidney Berger, Great Neck; Salvatore Buda, East Hills; Burton Weintraub, Old Bethpage, all of N.Y.

[73] Assignee: Berger Industries, Inc., Maspeth, N.Y.

[22] Filed: Oct. 14, 1975

[21] Appl. No.: 622,105

[52] U.S. Cl. .................. 285/31; 285/110; 285/175; 285/354
[51] Int. Cl.² .................................. F16L 19/00
[58] Field of Search ........... 285/354, 334.5, 382.4, 285/382.5, 45, DIG. 22, 31, 32, 386, 387, 388, 175, 110

[56] References Cited

UNITED STATES PATENTS

| 998,587 | 7/1911 | Mueller | 285/382.4 X |
|---|---|---|---|
| 1,262,263 | 4/1918 | Rust | 285/354 X |
| 1,269,924 | 6/1918 | Gathright | 285/354 X |
| 1,697,815 | 1/1929 | Hagstedt | 285/334.5 X |
| 2,383,692 | 8/1945 | Smith | 285/334.4 X |
| 2,477,677 | 8/1949 | Woodling | 285/354 X |
| 2,645,099 | 7/1953 | Cumming | 285/354 X |
| 3,544,281 | 12/1970 | Phillips | 285/DIG. 22 X |
| 3,823,965 | 7/1974 | Emberson | 285/334.5 |
| 3,915,478 | 10/1975 | Al et al. | 285/45 |

FOREIGN PATENTS OR APPLICATIONS

| 1,539,096 | 8/1968 | France | 285/354 |

*Primary Examiner*—Thomas F. Callaghan
*Attorney, Agent, or Firm*—Kirschstein, Kirschstein, Ottinger & Frank

[57] ABSTRACT

Each section of a conduit has a male pipe thread formed on its outer wall surface at one end. The other end of each conduit section has a short length of decreased outside diameter extending axially inwardly with a decreased axial passageway through the reduced diameter length. A sloping annulus is formed between the length of decreased outside diameter and the remainder at the conduit section. The other end is flared and has a flat end face substantially perpendicular to the longitudinal axis of the conduit section. A coupling sleeve has an annular flange at its axially inward end which defines a central opening such that the coupling sleeve may slide freely to a limited extent over the length of decreased diameter of the other end of the conduit section. The axially outward end of the coupling sleeve has female machine threads formed thereon. Intermediate the inner surface of the flange and the threaded portion is a sloped shoulder. The coupling sleeve is retained captively on this other end by the interaction of the flange with the sloped annulus and the sloped shoulder with the flared end of the conduit section. The axial extent of the short length of decreased outside diameter is such that when said flange abuts the sloped annulus the end face of the coupling sleeve does not project beyond, e.g., is at least flush with the associated end face of the conduit section.

7 Claims, 6 Drawing Figures

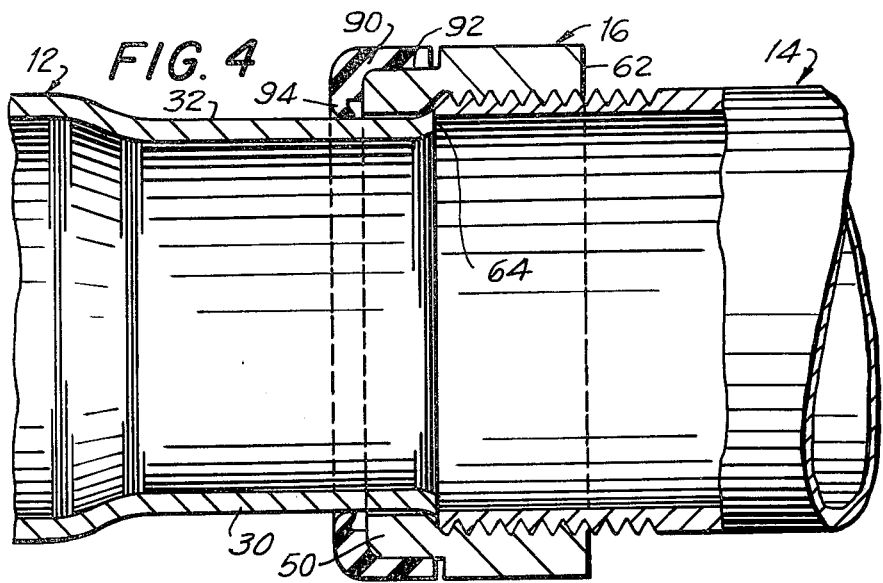
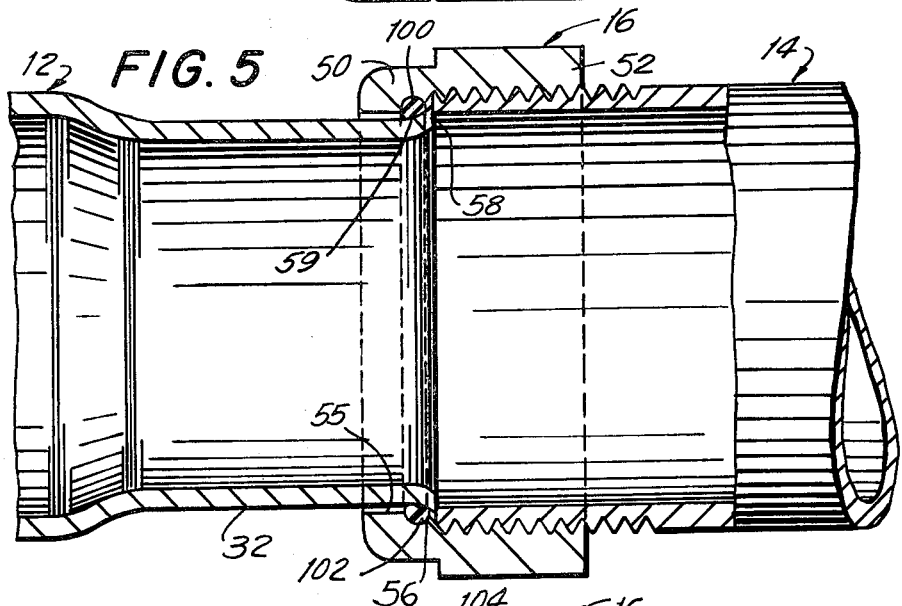
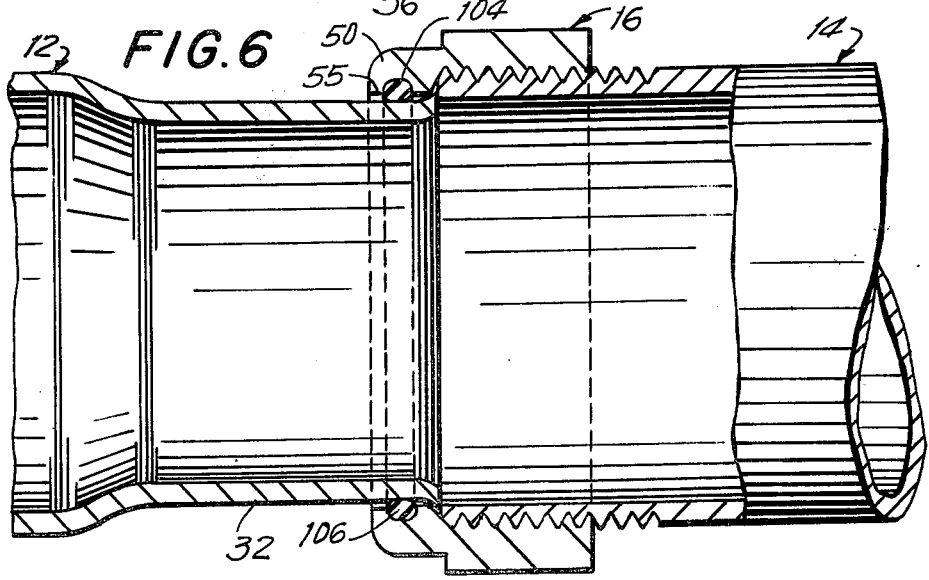

CONDUIT JOINT

BACKGROUND OF THE INVENTION

1. Field of the Invention

The invention relates to a conduit joint and more particularly to a joint wherein conduit sections each having one end threaded are joined by a coupling ring which permits the sections to swivel slightly with respect to one another during coupling and which allows the sections to be disassembled without being rotated and without axial longitudinal displacement.

2. Description of the Prior Art

Until very recently, there were on the market only two types of steel conduit. One of these was denominated as rigid pipe and the other as light walled conduit.

Rigid pipe has been available for over a hundred years. It is a thick walled pipe that is conventionally used for the transmission of water and gas. It is used also for sheathing electric wires in buildings where it frequently is embedded in concrete. As a sheathing for electrical wires, rigid pipe is used where there are high strength requirements or where the pipe is subjected to heavy or sudden shock loads. Still further, rigid pipe is used for drilling oil wells, for oil casings, and for encasing electric lines which are carried across bridges.

This type of pipe comes in sections of various lengths depending upon the trade in which it is employed but usually is from ten to twenty feet long.

Rigid pipe sections are connected by screw couplings. Both ends of a pipe section have tapered male threads formed thereon. These threads are V-shaped to standardize dimensions having a slightly flattened crest and a slightly flattened base. Both ends of a screw coupling have a tapered female pipe thread which mesh with a male pipe thread. The mesh is quite good and because the threads are tapered, when they are joined, they make a joint that is essentially hermetic. The joint does not require sealing means such as mastic or pipe compounds, although sealing means optionally may be employed.

There are certain disadvantages associated with the use of rigid pipe as for example when it is to act as a conduit for insulated electric wires. As a result of the pipe having thick walls, each section is expensive inasmuch as a large amount of steel is required. Also, each section is difficult to handle because of its weight. Each pipe section must be rotated in the field when it is connected to another length of pipe. The weight of the pipe section makes the rotation difficult. Another drawback is that if a section of pipe or a fitting is damaged, the pipe or fitting has to be replaced either by being cut and removed or by unscrewing the entire layout piece by piece until the damaged section is removed.

Moreover, since the screw coupling must mesh with male threads on adjacent pipe sections, the sections must be in perfect axial alignment in order for the threads to mesh properly. As is often the case in field installations where replacements must be made to existing pipe systems, the pipe sections are not in perfect alignment and problems result in assembling the sections.

The other kind of conduit which has been developed for sheathing electrical cables is light walled conduit. Light walled conduit was designed solely for the purpose of encasing electric cables to protect them from damage. Because it does not have to withstand large stresses, it is thin walled. An immediately obvious advantage of light walled conduit is its light weight and hence lower material cost as compared to rigid pipe.

An obvious disadvantage of light walled conduit is that it cannot be used in instances where it might be subjected to heavy loads. In addition, because of its thin wall, this type of conduit cannot be threaded. Compression couplings are most often used to join sections of light walled conduit. The ensuing joint is not able to withstand substantial internal pressure or tensile stress. The advantage of compression couplings over the screw couplings used in connection with the rigid pipe is that if any section of conduit or any other fitting is damaged, the coupling can be opened and the damaged section or fitting can be pulled out transversely without removing sections or fittings that were not damaged.

Recently, due to the scarcity (and consequently resulting higher price) of steel, a medium walled pipe known as utility pipe or intermediate metal conduit was developed having a wall thickness less than the wall thickness of the rigid pipe but greater than the wall thickness of the light walled conduit. The intermediate metal conduit is heavy enough to take intensive loads and can be hermetically sealed at the joints.

Intermediate metal conduit has used screw couplings for the joints, causing the same problems to arise in connection with this conduit as with the rigid pipe, namely, the necessity of rotating conduit sections to make up joints or the necessity of unscrewing the sections one after another from an end of a run of pipe when an intermediate section or fitting has to be removed. Further, the axial alignment problem inherent in the rigid pipe system is also present.

It is towards elimination of these and other problems that the present invention is directed.

SUMMARY OF THE INVENTION

1. Purposes of the Invention

It is an object of the present invention to provide an improved conduit joint providing a substantially hermetic joint between two sections of threadable conduit.

Another object of the present invention is to provide a conduit joint in which a coupling is captively attached to a threadable conduit section.

A further object of the present invention is to provide a conduit joint wherein the coupling permits some swivelling movement between lengths of threadable conduit as they are joined.

Yet another object of the present invention is to provide a conduit joint which will permit shortening of lengths of threadable conduit in the field for accomodation of existing spatial requirements.

A still further object of the present invention is to provide a conduit joint which will permit removal of individual lengths without axially displacing adjacent threadable conduit sections or disassembling the system from one end to a point where replacement of a section or fitting is to be accomplished.

Other objects of the invention in part will be obvious and in part will be apparent in the following description.

2. Brief Description of the Invention

Generally speaking, identical first and second conduit sections which have walls thick enough to be threaded, have male threads on one of their ends and are joined by means of a coupling sleeve which is mounted captively on a non-threaded end of a first conduit section, being freely rotatable thereon and axially slidable to a limited extent. This end has a span extending axially inwardly from the end of the first conduit section which span has a reduced axial passageway therethrough and a reduced outside diameter. A sloped shoulder in the outer wall surface joins the inward end of the span to the remainder of the section. The axially outward end of the non-threaded end is flared outwardly i.e. - away from the longitudinal axis of the conduit section. The flared end has a flat end face substantially perpendicular to the longitudinal axis of the conduit section. A coupling sleeve has an inwardly extending flange at its axially inward end and has a female thread on its inside surface at its axially outward end. An internal shoulder slopes radially outwardly from the inner surface of the flange to the threaded end. The flange defines an opening slightly greater in diameter than the reduced outer wall surface but less than the diameter of the remainder of the section and the flared end so that the coupling sleeve is permitted limited axially inward and outward movement on the conduit section.

To assemble the conduit sections the flat parallel end faces of the sections, one at the unthreaded end and the other at the threaded end, are butted together. The coupling sleeve is then screwed on to the threaded end until the sloped shoulder on the coupling sleeve presses against the axially inward surface of the flared end, forcing the two end faces together under considerable stress to form a tight joint.

To disassemble the sections, the coupling sleeve is unthreaded from the adjacent conduit section and retracted axially inwardly until the flange abuts the sloped shoulder in which position the end face of the coupling sleeve will be positioned axially inwardly of the end face of the conduit section to allow either conduit section to be laterally displaced without any longitudinal movement relative to the other conduit section.

The invention consists in the features of construction and arrangement of parts which will be detailed hereinafter and described in the appended claims.

BRIEF DESCRIPTION OF THE DRAWINGS

For a better understanding of the above invention reference should be had to the accompanying drawings wherein like numerals of reference indicate similar parts throughout the several views and wherein:

FIG. 4 is a view similar to FIG. 1 but showing the coupling sleeve provided with a seal;

FIG. 5 is another view similar to FIG. 1 but showing an alternative sealing arrangement; and FIG. 6 is another view similar to FIG. 1 but showing still another sealing arrangement.

DESCRIPTION OF THE PREFERRED EMBODIMENT

Figure 1:
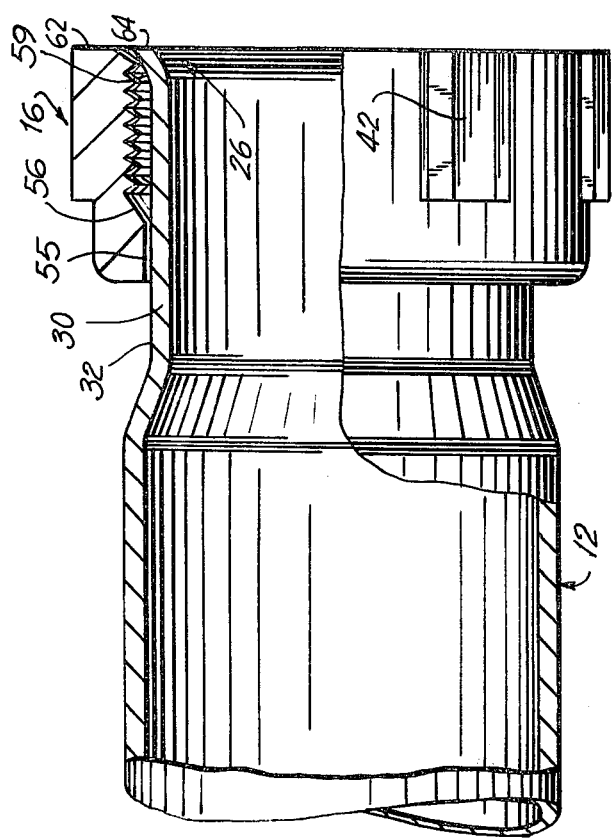
FIG. 1 is a fragmentary sectional axial view of two assembled threadable conduit sections embodying the present invention.
Figure 2:
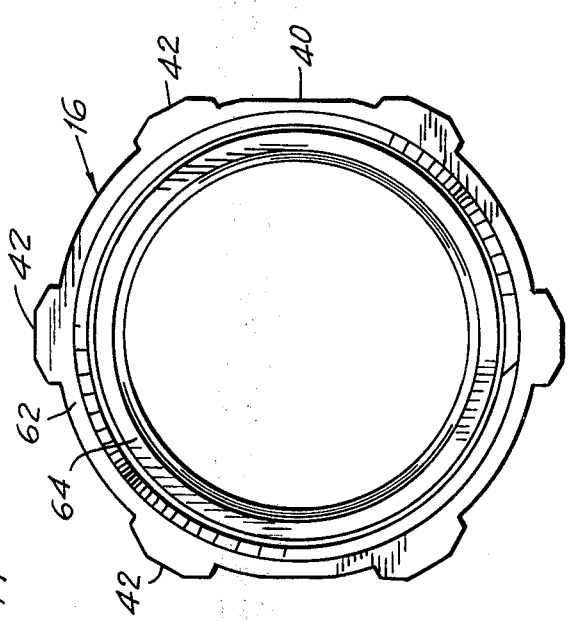
FIG. 2 is a partial sectional view of a conduit section with the coupling sleeve in its fully retracted position.

With reference to FIGS. 1 and 2, a conduit joint is identified generally by the reference numeral 10. It includes a first and a second threadable conduit section 12 and 14, respectively, and a coupling sleeve 16 which is held captively on the end of section 12. The sections 12 and 14 are identical. The sections 12 and 14 have portions 17 and 18 with generally cylindrical outer wall surfaces 19 and 20, respectively. Each section has a constant diameter axial passage therethrough except at the end on which the coupling sleeve is captively held as will hereinafter be described. These sections typically are made of metal such as mild steel, wrought iron, a silicone bronze alloy or an aluminum alloy. As can be seen, the end portion 22 of the second section 14 has tapered male pipe threads 24 formed in its outer wall surface 20.

While only a portion of each section of conduit is illustrated, it is to be understood that each section has one end on which is mounted a coupling sleeve in accordance with the present invention, and another end having male pipe threads formed therein.

In the specification and the claims, the terms "axially inwardly" and "axially outwardly" are used with reference to the end face of the conduit section on which the coupling sleeve is retained, that is "axially inwardly" refers to a vector extending from that end face of the conduit section towards the other end face of the conduit section. Conversely, "axially outwardly" refers to a vector extending outwardly away from that end face.

The coupling sleeve 16 is free for rotation and for limited axial movement relative to the end 26 of the first section 12. As can be seen in FIGS. 1 and 2, a short length of reduced outer diameter 30 is selected to permit the coupling sleeve 16 to be retracted axially inwardly along the outer wall surface 32 of the first section 12 far enough for the end face of the coupling sleeve 16 to be at least flush with the end face of the first section as will hereinafter be described in detail. The axial passageway in the section is of a reduced diameter through the short length. A sloping annulus 34 permits a smooth transition between the length of reduced outer diameter 30 and the portion 17 on both the outer wall surface of the section and in the axial passageway.

Figure 3:
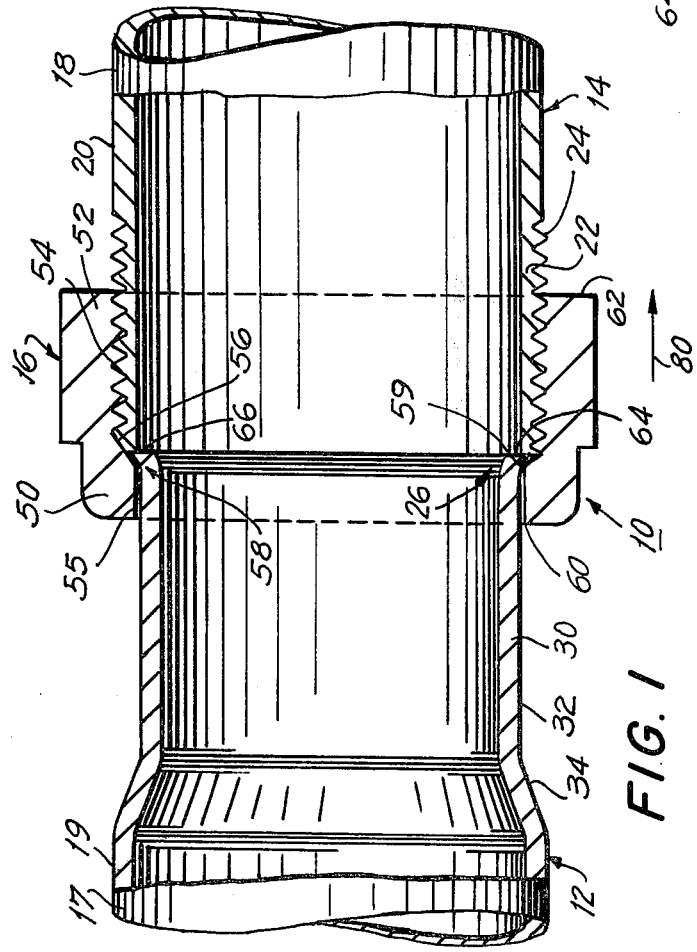
FIG. 3 is an end view of the conduit section at the end with the coupling sleeve mounted thereon.

The coupling sleeve in accordance with the present invention can be made of any suitable material such as steel, malleable iron, bronze, an aluminum alloy or a zinc die cast alloy. As shown in FIG. 3 the coupling sleeve 16 has an external circumference 40 which is formed into a shape that enables it to be gripped by a torquing tool (not shown) such as a pipe wrench. The coupling sleeve may have radially outwardly extending projections 42 which provide bearing surfaces for torquing tools. It is to be understood that the particular configuration of the external circumference which enables the coupling sleeve to be gripped by torquing tools is well known in the art and does not form a part of this invention.

The coupling sleeve 16 has a radially inwardly extending flange 50 at its axially inward end which defines a central opening slightly greater in diameter than that of the outer wall surface 32. On the inner surface of the axially outward end portion 52 of the coupling sleeve 16 are formed female machine threads 54. The female machine threads are dimensioned to mesh initially with the male pipe threads 24; however, since the male threads are tapered and the female threads are not, when the threads are mated and tightened, they eventually will jam to form a substantially hermatic joint between the coupling sleeve and the section 14.

Intermediate the flange 50 and the axially outward end portion 52 is a radially outwardly extending shoulder 56 sloping axially outwardly from the inner surface 55 of the flange to the axially outward end portion.

The coupling sleeve 16 can be slipped on to the end 26 of the conduit section 12. The length of the reduced diameter 30 extends a distance axially inwardly from the end of the conduit section to permit the axially outward end faces of the coupling sleeve to be spaced axially inwardly from the end of the conduit section so that a radially outwardly extending flare 58 may be formed at the end of the conduit section. The flare 58 is formed by conventional rolling techniques which are well known in the art and which do not form a part of the present invention. It is the interaction of the flange 50 with the sloped annulus 34 and the sloped shoulder 56 with the axially inward surface 59 on the flare 58 which captively retains the coupling sleeve on the end of the conduit section. The coupling sleeve is prevented from moving axially outwardly by the axially inward face 59 of the flare 58 but can still be moved axially inwardly until the axially inward corner 60 of the flange 50 abuts the sloped annulus 34. The axial extent of the reduced diameter length 30 after the flare 58 is formed is equal to at least the axial length of the coupling sleeve 16 so that when the axially inward corner 60 abuts the sloped annulus 34 the flat end face 62 of the coupling sleeve 16 is at least flush with the flat end face 64 of the unthreaded conduit section 12, as shown in FIG. 2, for reasons which will hereinafter become apparent.

To assemble the first and second conduit section, the first section 12 is brought into axial alignment with the second section 14 and its flat end face 64 at its unthreaded end butted against the flat end face 66 at the threaded end of section 14. The flat end faces 64 and 66 are parallel to each other and are substantially perpendicular to the axis of their respective conduit sections. The inner edge of the end face 66 preferably is slightly chamfered or beveled to remove burrs. The coupling sleeve then is threaded onto the end 22 until the sloped shoulder 56 engages the axially inward surface 59 on the flare 58. As an effort is made to tighten the coupling sleeve 16 further along the end 22 an axially outwardly directed force 80 (shown in FIG. 1) is created. As the shoulder 56 is forced against the surface 59, the force will be transmitted to the end face 64 of the conduit section 12 causing the face to be squeezed against the juxtaposed end face 66 of the conduit section 14. The tapered male threads 24 are so dimensioned relative to the female threads of the coupling sleeve 50 that the threads start to jam but have not fully jammed when the desired squeezing pressure has been developed at the abutment between the juxtaposed faces 64, 66. With the adjoining section thus coupled the axial passageways thereof are in axial alignment. Testing has shown that a coupling sleeve in accordance with the present invention can withstand any axially outwardly directed force that can be developed by torquing the sleeve with conventional assembly tools.

If, as is often the case in field installations, the sections to be joined are not in, or cannot be brought into, an axial alignment sufficiently good to join rigid pipe sections with a threaded coupling, the sections still may be joined with ease. The central opening formed by flange 50 is slightly greater than the outer wall surface 32 of the reduced diameter area 30 so that there is a slight clearance of about 0.020 to 0.040 inch, on the diameter, between the flange and the outer wall of the conduit. This clearance permits a slight swivelling of the coupling sleeve 16 on the end of section 12 up to about ½° away from the longitudinal axis of the section. Therefore, the female thread on the coupling sleeve can mate readily with the male thread on the end of an adjoining conduit section even if the sections are not in exact axial alignment. The end faces of the sections will not abut each other initially in this situation, but they will abut after the coupling sleeve is tightened and the sections flex slightly to accomodate the abutment.

When assembled sections of conduit are to be disassembled the coupling sleeve 16 is unthreaded from the end 22 and backed off until the inner corner 60 abuts the sloped annulus 34. As mentioned hereinabove, the end face 62 of the coupling sleeve 16 at this time will be at least flush with the end face 64 of the conduit section 12 (FIG. 2) so that either conduit section 12 or 14 can be displaced laterally without longitudinal movement relative to the other conduit section. Naturally, the joint at both ends of a given conduit section will have to opened (disassembled) in order to remove that section.

While the joint in accordance with the present invention is essentially hermetic due to the appreciable force which squeezes the juxtaposed flat faces 64, 66 together and to the squareness of said ends to the longitudinal axis of the conduit sections, sealing means may be provided to further ensure that the joint will be leakproof.

As shown in FIG. 4 an annular elastomeric sealing collar 90 may be positioned on a reduced outer diameter section 92 formed on the axially inward end of the coupling sleeve 16. The diameter of the collar when off this section 92 is slightly less than that of the sections so that the collar must be stretched before it is so positioned and when positioned will be a snug fit on the section. A radially inwardly extending lip 94 of the collar 90 abuts the outer surface 32 of the length of reduced diameter 30 to provide a barrier which prevents leakage between the flange 50 and the outer wall surface 32. The lip is thinner than the collar to increase its flexibility and allow it to adapt itself to any irregularities in the outer surface 32.

An alternative sealing arrangement is illustrated in FIG. 5 wherein the coupling sleeve 16 is modified so that an arcuate recess 100 is provided in the sloped shoulder 56 between the flange 50 and the axially end portion 52. The arcuate recess 100 is adapted to receive an elastomeric sealing O-ring 102 therein which is held tightly against the outer surface 32 of the conduit section. When the coupling sleeve 16 is tightened on the end of the section 14, the sealing O-ring is caught between the axially inward surface 59 of the flare and the flange 50. When squeezed between the recess and the outer surface of the flare the O-ring will prevent water from the passing between the face 55 of the flange 50 and the outer wall surface 32.

Another form of sealing arrangement is shown in FIG. 6 wherein an annular groove 104 is formed in the inner surface 55 of the flange 50. An elastomeric O-ring 106 is positioned therein, tight on the conduit section. This prevents leakage between the flange 50 and the outer wall surface 32.

It can be seen from the foregoing detailed description that the primary object of the present invention, namely to create an improved conduit joint, has been achieved by providing a coupling sleeve captively retained on one end of a first conduit section. The coupling sleeve is captively retained by the interaction of a flange on the coupling sleeve and a sloped annulus on the outer wall surface of the conduit section and a sloped shoulder on the coupling sleeve and a flare at the end of the conduit section.

To assemble two sections of conduit, the end of a second conduit section having external threads formed thereon is abutted against the end of the first conduit section having a coupling sleeve thereon. The coupling sleeve is then threaded on to the end portion until the sloped shoulder presses against the flare in order to force the ends of the two sections against one another. To disassemble the conduit sections the coupling sleeve is backed off the end of the adjacent conduit section until the flange abuts the stop shoulder in which position the end face of the coupling sleeve will be at least flush with the end face of the conduit section, permitting one conduit section to be moved laterally without moving either conduit section longitudinally along its axis.

While in accordance with the patent statutes, a preferred embodiment of the present invention has been illustrated and described in detail, it is to be particularly understood that the invention is not limited thereto or thereby.

Having thus described the invention, there is claimed as new and desired to be secured by this invention:

1. In combination:
   a. a first two-ended conduit section having a circular outer wall surface and an axial passageway therethrough, one end of said first conduit section being non-threaded and having a flat end face substantially perpendicular to the longitudinal axis of said first section, said first section including a length of reduced outside diameter extending axially inwardly from said flat substantially perpendicular end face and terminating at a sloped annulus in said outer wall surface where it joins the remainder of said first conduit section, said length of reduced outside diameter having an outward flare with an axially inward surface, said flare being immedately adjacent said flat substantially perpendicular end face, said axial passageway being of a reduced diameter through said length, said other end of said first conduit section having external thread means thereon and a flat substantially perpendicular end face;
   b. a second conduit section identical to the first conduit section;
   c. a coupling sleeve having an axially inward and axially outward end, said axially outward end having an end face, said coupling sleeve having a portion including female thread means extending from said end face and constructed and dimensioned to engage said external thread means on said other end of said second conduit section;
   d. said flare having an outer diameter slightly less than said portion on said coupling sleeve;
   e. an inwardly extending flange on said coupling sleeve at its axially inward end, said flange defining a central opening of a diameter slightly greater than said diameter of said length of reduced outside diameter so that said coupling sleeve may be permitted free rotation thereon, said central opening being of a diameter less than the outside diameter of the remainder of said conduit section and outside diameter of said flare;
   f. a sloped shoulder on said coupling sleeve intermediate said flange and said female thread means extending radially outwardly from said flange, said sloped shoulder adapted to bear against said axially inward surface of said flare, said shoulder preventing said coupling sleeve from being pulled axially outwardly from said first conduit section as said coupling sleeve is threaded onto said externally threaded other end of said second conduit section so as to force said flat substantially perpendicular end faces of said first and second conduit sections together;
   g. said length of reduced outside diameter extending axially inwardly at least the length of said coupling sleeve, said sloped annulus cooperating with said flange to restrict the axially inward distance said coupling sleeve may move on said first conduit section so that said coupling sleeve may be backed off said externally threaded other end of said second conduit section after said first and second conduit sections are assembled whereby said end face of said coupling sleeve is at least flush with said flat substantially perpendicular end face of said first conduit section to permit said first conduit section to be laterally displaced from said second conduit section without longitudinal movement of either conduit section.

2. The combination in accordance with claim 1 wherein one of said thread means is a pipe thread and the other of said thread means is a machine thread, said thread means meshing to form an hermetic seal when said coupling sleeve is threaded on said end of said second conduit section.

3. The combination in accordance with claim 1 further including sealing means to prevent leakage of water between said coupling sleeve and said first conduit section when two adjacent sections are joined by said coupling sleeve.

4. The combination in accordance with claim 3 wherein said sealing means comprises:
   a. means providing an annular groove in said flange, and
   b. a sealing elastomeric O-ring in said annular groove and tight on said length of reduced outside diameter.

5. The combination in accordance with claim 3 wherein said sealing means comprises:
   a. an annular elastomeric sealing collar tight on said coupling sleeve at its axially inward end; and
   b. a radially inwardly extending lip integrally formed with said collar and engaging said length of reduced outside diameter.

6. The combination in accordance with claim 3 wherein said sealing means is a sealing elastomeric O-ring caught between the outer surface of the flare and the inner surface of the flange.

7. The combination in accordance with claim 1 wherein said central opening defined by said flange is dimensioned to create a clearance between said flange and said length of reduced outside diameter to permit swivelling of said coupling sleeve on said non-threaded end of said first conduit section so that said female thread means on said coupling sleeve can mate with said external thread means on said other end of said second conduit section when said first and second conduit sections are not in exact axial alignment.

* * * * *